United States Patent
Stiller et al.

[11] Patent Number: 5,886,266
[45] Date of Patent: Mar. 23, 1999

[54] TANK INSERT FOR INSERTION IN AN OPENING IN A FUEL TANK

[75] Inventors: Rudolf Stiller, Niederdorfelden; Andreas Maennchen, Frankfurt; Norbert Schmidt, Eppstein, all of Germany

[73] Assignee: VDO Adolf Schindling AG, Frankfurt, Germany

[21] Appl. No.: 7,247

[22] Filed: Jan. 14, 1998

Related U.S. Application Data

[63] Continuation of Ser. No. 432,230, May 1, 1995, abandoned.

[30] Foreign Application Priority Data

Jul. 1, 1994 [DE] Germany ............. 44 23 095.8

[51] Int. Cl.⁶ ........................................................ G01L 7/00
[52] U.S. Cl. .............................. 73/756; 73/715; 73/724
[58] Field of Search .............................. 73/756, 715, 724, 73/291, 299, 301; 220/DIG. 33, 203.19, 203.23, 203.24, 203.27

[56] References Cited

U.S. PATENT DOCUMENTS 5,339,788 8/1994 Blumenstock et al. .
5,400,759 3/1995 Ishida .

FOREIGN PATENT DOCUMENTS 4132055 4/1993 Germany .
4-325316 11/1992 Japan .

*Primary Examiner*—Joseph L. Felber
*Attorney, Agent, or Firm*—Martin A. Farber

[57] ABSTRACT

A sensor chamber (7) is provided in a holder (5) of a tank insert (4), a pressure sensor (8) being inserted into said chamber. This pressure sensor (8) rests on a circumferential packing (9) of a shoulder (10) of the sensor chamber (7).

8 Claims, 2 Drawing Sheets

ས,886,266

TANK INSERT FOR INSERTION IN AN OPENING IN A FUEL TANK

RELATED APPLICATION

This application is a continuation application of our application Ser. No. 08/432,230 filed May 1, 1995, now abandoned, the entire disclosure of which is considered as being part of the disclosure of this continuation application and is hereby incorporated herein by reference.

FIELD AND BACKGROUND OF THE INVENTION

The present invention relates to a tank insert which can be inserted into an opening in a fuel tank and which bears a fuel feed device and/or a level indicator by means of a holder which closes the opening, the tank insert being furthermore provided with a pressure sensor.

Recently, the recognition of leaks in fuel systems of automotive vehicles has become of increasing importance. Leaks can arise, for instance, in the line connections due to defective connections or else due to stones in the tank itself, or they may occur after the filling of the tank if one forgets to screw the gas cap onto the opening of the tank. Leaks in the fuel system can lead to fuel coming against hot parts of the vehicle and igniting. It is also dangerous if, for instance diesel fuel can drip onto the road as the result of a leak, since there is then the danger of skidding, which is particularly critical for motorcyclists. Environmental aspects also make a dependable monitoring of the tightness of fuel systems necessary.

Leakages in fuel systems can be recognized by measurement of the pressure on the spot with the use of suitable evaluation algorithms. For example, the fuel tank can be subjected to pressure or vacuum when the vehicle is at a standstill and before it is started, and it can then be determined by means of a pressure sensor whether, after a disconnecting of the fuel tank from a source of pressure fluid under pressure or vacuum, whether this pressure remains constant in the fuel tank. If not, then a leak must be present. However, the arrangement of the pressure sensor is problematical here, since due to it, there is additionally a danger of leaks and a danger of the emission of fuel from the line leading to the pressure sensor.

SUMMARY OF THE INVENTION

It is an object of the invention so to develop a tank insert of the aforementioned type which is to be inserted into an opening in the tank that the pressure in the fuel tank can be measured also without additional danger of leaks or of emission of fuel.

According to the invention, the pressure senor (8) is arranged in a sensor chamber (7) of the holder (5).

The arrangement of a pressure sensor in a sensor chamber of the holder in accordance with the invention results in the least possible expense and does not require any lines which extend out of the fuel tank to the pressure sensor. Therefore, the pressure sensor can be provided in an extremely cost-favorable manner and does not lead to any additional risk of emission from the fuel system.

The tank insert is of particularly simple construction if, in accordance with a further advantageous development of the invention, the sensor chamber (7) is developed to receive a pressure sensor (8) and has, near to the end of the chamber on its end inside the tank, a circumferential shoulder (10) on which the pressure sensor (8) rests with the interposition of a circumferential axial packing (9), and the region of the tank-side end of the pressure sensor (8) which is located within the space defined by the packing (9) forms a pressure impact surface which is in communication with the inside of the fuel tank (2) via flow channels (12, 13) in the holder (5).

After the insertion of the pressure sensor, the packing is positively acted on by an established force if the shoulder (10) has, radially behind the packing (9), a step (18) of smaller height than the height of the packing (9) and if the pressure sensor (8) sits simultaneously on the packing (9) and said step (18). By this development the result is obtained that the packing is positively compressed by the pressure sensor by a fixed amount so that a particularly reliable seal is produced.

For the fixing of the pressure sensor in its position in which it partially compresses the packing, it is advantageous for the pressure sensor (8) to be held in its position within the sensor chamber (7) which prestresses the packing (9) by a holding ring (14) which, upon the assembly is fixed with a friction lock in the sensor chamber (7).

The holding ring can be held by force lock (i.e. held or supported by force) or form lock (i.e. held by the shape of the parts) in the sensor chamber so that the ring does not change its position even upon vibrations which occur in automotive vehicles if, in accordance with a further development of the invention, the holding ring (14) has an upper outer surface (19) which is set back from the wall of the sensor chamber (7), and if the sensor chamber (7) is so closed by a contact plate (6) welded to the holder (5) that, upon the welding, material enters into the space between the wall of the sensor chamber (7) and the set-back surface (19).

The pressure sensor can reliably withstand the corrosive components present in modern fuels if the pressure impact surface (11) is formed of a membrane (9') consisting, for instance, of ceramic The invention permits of numerous embodiments. By way of further explanation of its basic principle, two of these embodiments are shown in the drawing and will be described below.

BRIEF DESCRIPTION OF THE DRAWINGS

With the above and other objects and advantages in view, the present invention will become more clearly understood in connection with the detailed description of preferred embodiments when considered with the accompanying drawings, of which.

DETAILED DESCRIPTION OF THE PREFERRED EMBODIMENTS

Figure 1:
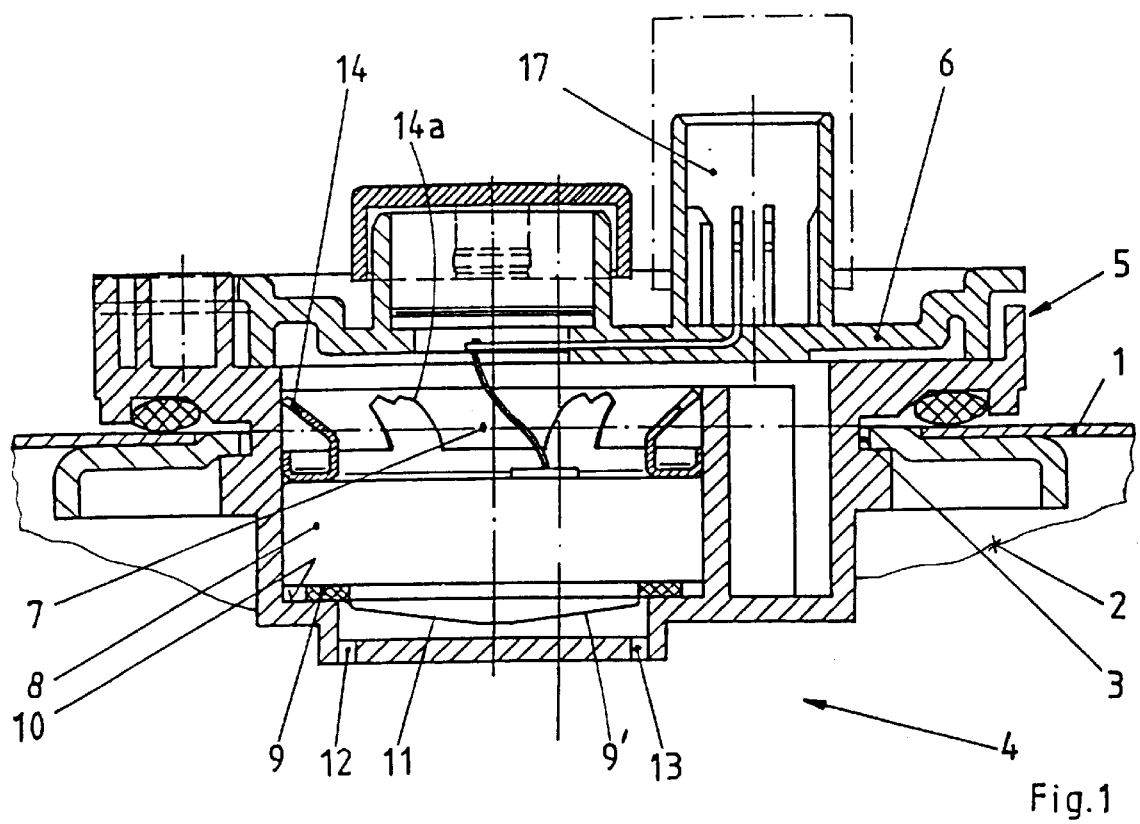
FIG. 1 is a vertical section through a mounted tank insert according to the invention.

FIG. 1 shows a portion of a top wall 1 of a fuel tank 2, the wall having an opening 3 into which there is inserted a tank insert 4. The tank insert 4 has a flange-shaped holder 5 which, for instance, bears a fuel-feed device (not shown) and/or a fuel-level sensor and is closed on top by a contact plate 6. As interface with the surrounding pressure, there is used a microporous liquid-impervious, but gas-pervious filter material.

A sensor chamber 7 which is provided in the holder 5 and into which a pressure sensor 8 is inserted from above before the mounting of the contact plate 6 is important for the invention. This pressure sensor 8 is seated on a circumferential axial packing 9, which in its turn lies on a lower shoulder 10 of the sensor chamber 7. The pressure sensor 8 has on its bottom side a pressure impact surface 11, it being preferably a ceramic membrane 9', and being in communication via flow channels 12, 13 with the inside of the fuel tank 2. The pressure sensor 8 is fixed axially by a holding ring 14 which has projections 14a by which it is pressed from above into the sensor chamber 7 and, has a shape permitting insertion into the sensor chamber 7.

Figure 2:
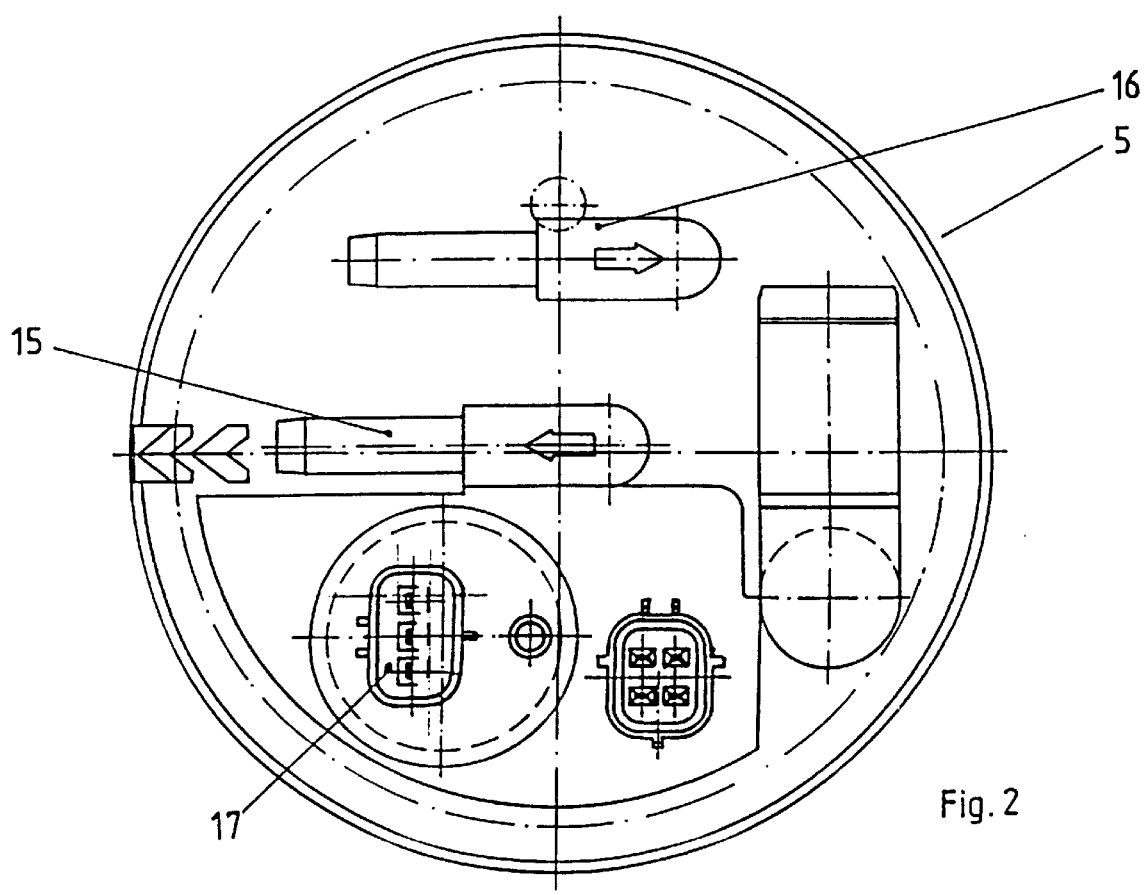
FIG. 2 is a top view of another tank insert.

The top view of the holder 5 in FIG. 2 shows a fuel outlet 15 from which fuel flows to an injection system (not shown) of an internal combustion engine. Furthermore, there is shown a return-flow connection 16 for the return flow of fuel. A plug 17 serves for electrical connection of a pressure sensor such as the pressure sensor 8 of FIG. 1.

Figure 3:
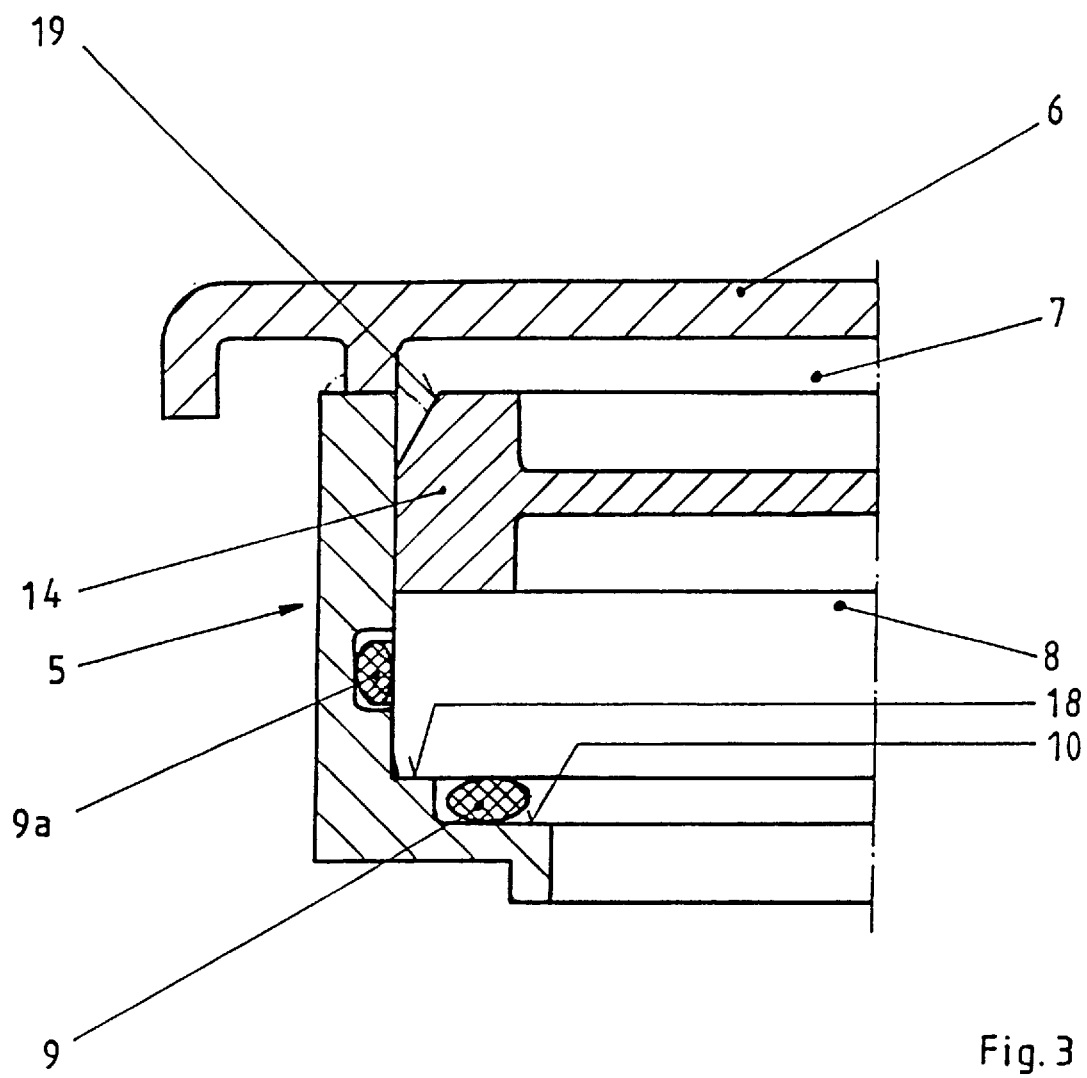
FIG. 3 is a vertical section through a portion of the tank insert of FIG. 2.

In the embodiment shown in FIG. 3, the pressure sensor 8 is seated on a step 18 which is somewhat less high than the packing in relaxed condition resting on the shoulder 10. Instead of the axial sealing of the pressure sensor 8, a radial seal can, however, also be provided. In order to show this, a packing 9a is shown in FIG. 3. The holding ring 14, which holds the pressure sensor 8 down, is provided in its upper region with an outer surface 19 which is set back from the wall surface of the sensor chamber 7. Upon the welding of the contact plate 6, material enters into the annular space of wedge-shaped cross section produced thereby, so that the holding ring 14, which upon assembly is initially held only by frictional lock in the sensor chamber 7, is then held in form-locked manner by material which flows into this annular space.

We claim:

1. A tank insert to be inserted into an opening in a fuel tank, the insert having a holder for a fuel feed device and/or a level indicator, the holder closing the opening upon emplacement of the insert in the opening and within the tank; and wherein the tank insert comprises a pressure sensor, and the holder comprises a sensor chamber for receiving the pressure sensor, both the chamber and the entire sensor being located within the tank upon emplacement of the insert within the tank, and wherein the sensor chamber is closed on top.

2. A tank insert according to claim 1, wherein the sensor chamber has a shape configured to receive the pressure sensor, and, near an end of the chamber disposed inside the tank, upon emplacement of the insert within the tank, the chamber has circumferential axial shoulder for supporting the pressure sensor;

the insert comprises a circumferential packing interposed between the circumferential shoulder of the chamber and the sensor;

a region of a tankside end of the pressure sensor, which is surrounded by the packing, serves as a pressure impact surface; and the holder has flow channels providing fluidic communication between the tankside end of the sensor and the inside of the fuel tank.

3. A tank insert according to claim 2, wherein the holder has a shoulder disposed radially from the packing, the shoulder is a stepped shoulder;

a radial inner step of the shoulder has a height smaller than a height of the packing which is disposed in the inner step of the shoulder; and the pressure sensor is resting also on a radial outer step of the shoulder as on the packing.

4. A tank insert according to claim 2, further comprising a holding ring, wherein the pressure sensor is held in its position within the sensor chamber by the holding ring resulting in a prestressing of the packing; and the holding ring is fixed with a friction lock in the sensor chamber during assembly of the insert.

5. A tank insert according to claim 4, further comprising a contact plate welded to the holder;

wherein the holding ring has an outer surface which is set back from a wall of the sensor chamber and, upon a closing of the sensor chamber by the contact plate, welding material enters into a space between the wall of the sensor chamber and the set-back surface.

6. A tank insert according to claim 1, wherein the sensor comprises a fluid-resistant membrane serving as a pressure impact surface.

7. A tank insert according to claim 6, wherein said membrane is made of ceramic.

8. A tank insert according to claim 1, further comprising a contact plate which closes the sensor chamber on top.

* * * * *